(12) United States Patent
Huang

(10) Patent No.: US 12,449,893 B1
(45) Date of Patent: Oct. 21, 2025

(54) TRACKING RESULT CALIBRATING METHOD, HOST, AND COMPUTER READABLE STORAGE MEDIUM

(71) Applicant: HTC Corporation, Taoyuan (TW)

(72) Inventor: Ya-Bo Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/641,460

(22) Filed: Apr. 22, 2024

(51) Int. Cl.
*G06F 3/01* (2006.01)
*G06F 3/0346* (2013.01)

(52) U.S. Cl.
CPC ............ *G06F 3/011* (2013.01); *G06F 3/0346* (2013.01)

(58) Field of Classification Search
CPC .............................. G06F 3/011; G06F 3/0346
See application file for complete search history.

(56) References Cited

U.S. PATENT DOCUMENTS

| | | | | |
|---|---|---|---|---|
| 2013/0278635 | A1* | 10/2013 | Maggiore | G06F 3/0304 345/633 |
| 2017/0371406 | A1* | 12/2017 | Yang | G06F 3/012 |
| 2018/0165864 | A1* | 6/2018 | Jin | G06F 3/0346 |
| 2023/0267692 | A1 | 8/2023 | Dong et al. | |

FOREIGN PATENT DOCUMENTS

| | | | | |
|---|---|---|---|---|
| CN | 108762495 | | 11/2018 | |
| CN | 117806449 | | 4/2024 | |
| GB | 2466714 A | * | 7/2010 | ............ A63F 13/211 |
| TW | 202024864 | | 7/2020 | |

OTHER PUBLICATIONS

"Office Action of Taiwan Counterpart Application", issued on Feb. 4, 2025, p. 1-p. 9.

* cited by examiner

*Primary Examiner* — Stephen G Sherman
(74) *Attorney, Agent, or Firm* — JCIPRNET

(57) ABSTRACT

The embodiments of the disclosure provide a tracking result calibrating method, a host, and a computer readable storage medium. The method includes: receiving a first body tracking result tracked by a body tracking device, wherein the first body tracking result comprises a plurality of reference points; obtaining a plurality of tracker poses of a plurality of trackers corresponding to the plurality of reference points; and calibrating the first body tracking result to a second body tracking result based on the plurality of reference points and the plurality of tracker poses of the plurality of corresponding trackers.

14 Claims, 9 Drawing Sheets

TRACKING RESULT CALIBRATING METHOD, HOST, AND COMPUTER READABLE STORAGE MEDIUM

BACKGROUND

1. Field of the Invention

The present disclosure generally relates to a calibrating mechanism, in particular, to a tracking result calibrating method, a host, and a computer readable storage medium.

2. Description of Related Art

See FIG. 1, which shows a schematic diagram of performing tracking by using a head-mounted display (HMD) and a body tracking device.

In FIG. 1, a user 199 holding handheld controllers 110 and 120 may be assumed to be experiencing a virtual world (e.g., a virtual reality (VR) world and/or an augmented reality (AR) world, etc.) provided by the HMD 100. In this case, the HMD 100 and the handheld controllers 110 and 120 may be used to track the movements of the head and hands of the user 199, such that the user 199 may interact with the virtual world provided by the HMD 100.

Specifically, the poses of the HMD 100 and the handheld controllers 110 and 120, which respectively characterize the movements of the head and hands of the user 199, may be tracked by the HMD 100 by using tracking mechanisms such as inside-out tracking (e.g., simultaneous localization and mapping (SLAM)).

In FIG. 1, the poses 100a, 110a, and 120a may be used to characterize the tracked poses of the HMD 100 and the handheld controllers 110 and 120 in the virtual world.

In some applications, a body tracking device 130 (e.g., a body tracking camera) may be used to perform body tracking to the body of the user 199. For example, the body tracking device 130 may capture images of the (whole) body of the user 199 and accordingly determine the (3D) positions of each joint on the body of the user 199 by using, for example, outside-in tracking. In this case, the body skeleton 130a of the user 199 in the virtual world can be determined.

However, since the coordinate system and/or scale used for characterizing the poses 100a, 110a, 120a of the HMD 100 and the handheld controllers 110 and 120 may be different from the coordinate system and/or scale used for characterizing the (3D) positions of each joint on the body skeleton 130a, the poses 100a, 110a, and 120a may not be properly aligned with the corresponding joints on the body skeleton 130a in the virtual world.

For example, as shown in FIG. 1, the poses 100a, 110a, and 120a may not be able to properly aligned with the corresponding head joint and wrist joints on the body skeleton 130a in the virtual world, and such misalignment can lead to a significant impact on the user experience in VR/AR applications.

For example, if the HMD 100 directly render an avatar corresponding to the user 199 based on the body skeleton 130a, the rendered avatar may not have a scale/position/orientation properly corresponding to the user 199 in the virtual world, which may degrade the user experience.

SUMMARY OF THE INVENTION

Accordingly, the disclosure is directed to a tracking result calibrating method, a host, and a computer readable storage medium, which may be used to solve the above technical problems.

The embodiments of the disclosure provide a tracking result calibrating method, applied to a host. The method includes: receiving, by the host, a first body tracking result tracked by a body tracking device, wherein the first body tracking result comprises a plurality of reference points; obtaining, by the host, a plurality of tracker poses of a plurality of trackers corresponding to the plurality of reference points; and calibrating, by the host, the first body tracking result to a second body tracking result based on the plurality of reference points and the plurality of tracker poses of the plurality of corresponding trackers.

The embodiments of the disclosure provide a host including a storage circuit and a processor. The storage circuit stores a program code. The processor is coupled to the storage circuit and accesses the program code to perform: receiving a first body tracking result tracked by a body tracking device, wherein the first body tracking result comprises a plurality of reference points; obtaining a plurality of tracker poses of a plurality of trackers corresponding to the plurality of reference points; and calibrating the first body tracking result to a second body tracking result based on the plurality of reference points and the plurality of tracker poses of the plurality of corresponding trackers.

The embodiments of the disclosure provide a computer readable storage medium, the computer readable storage medium recording an executable computer program, the executable computer program being loaded by a host to perform steps of: receiving a first body tracking result tracked by a body tracking device, wherein the first body tracking result comprises a plurality of reference points; obtaining a plurality of tracker poses of a plurality of trackers corresponding to the plurality of reference points; and calibrating the first body tracking result to a second body tracking result based on the plurality of reference points and the plurality of tracker poses of the plurality of corresponding trackers.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
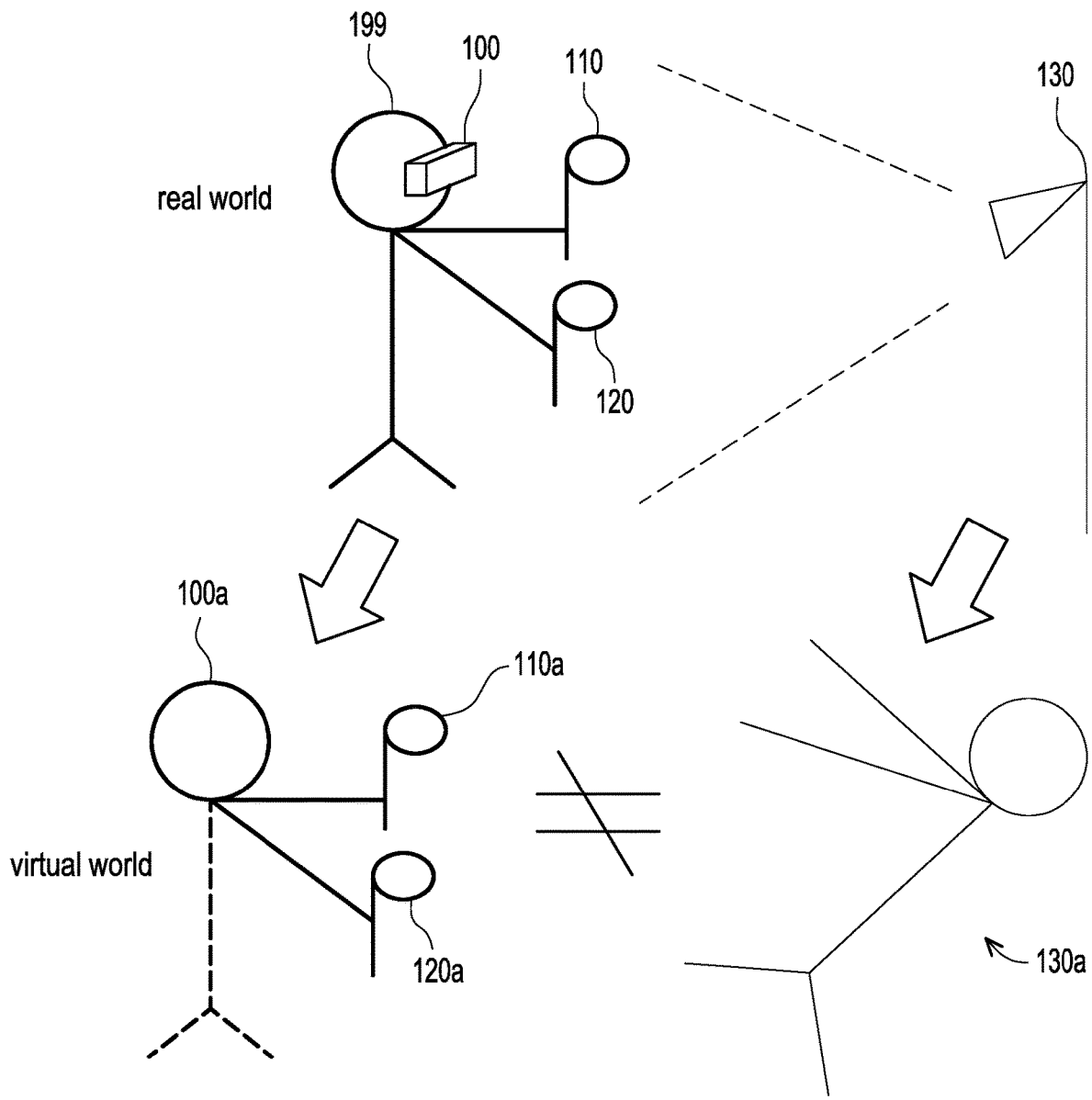
FIG. 1 shows a schematic diagram of performing tracking by using a head-mounted display (HMD) and a body tracking device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
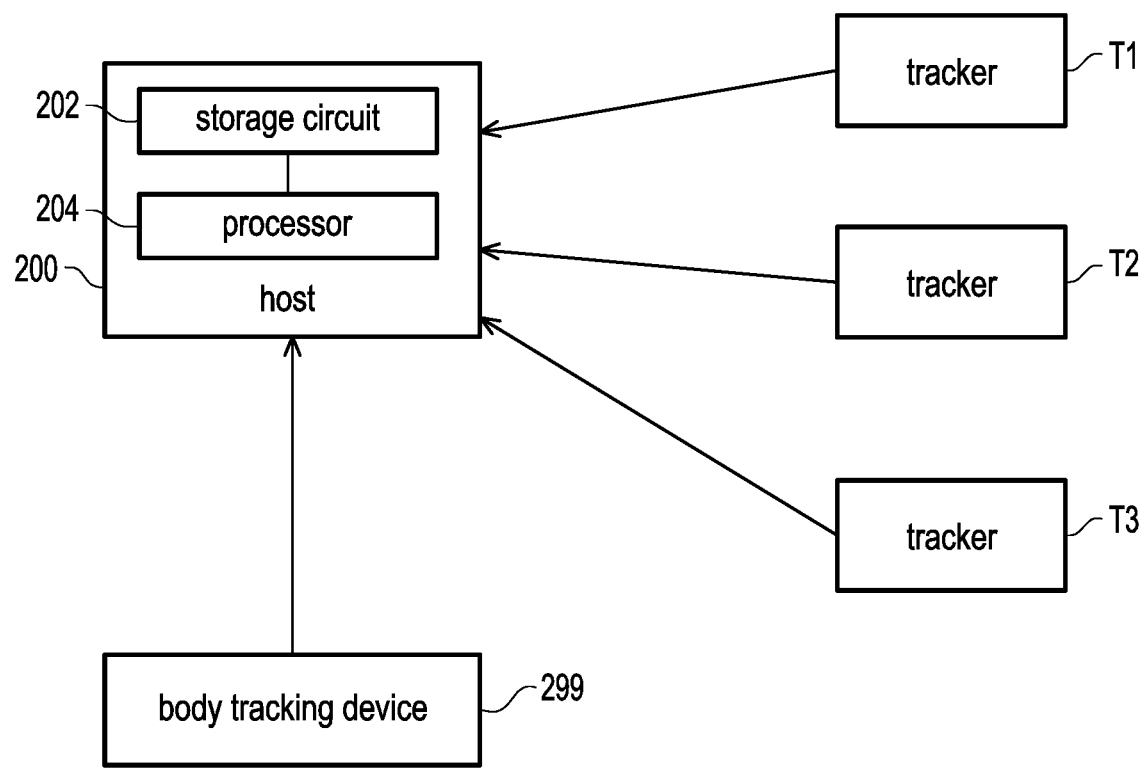
FIG. 2 shows a schematic diagram of a host, trackers, and a body tracking device according to an embodiment of the disclosure.

See FIG. 2, which shows a schematic diagram of a host, trackers, and a body tracking device according to an embodiment of the disclosure.

In various embodiments, the host 200 may be any smart device and/or computer devices. In some embodiments, the host 200 can also be an HMD for providing the visual contents of reality services (e.g., AR/VR services) for the wearer to see, but the disclosure is not limited thereto.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In one embodiment, each of the trackers T1 to T3 may be, for example, an HMD (e.g., a VR HMD), a wearable device, a handheld controller (e.g., VR handheld controller), or any other trackable objects/devices, but the disclosure is not limited thereto.

In one embodiment, the body tracking device 299 may be used to perform body tracking (e.g., full body tracking) to a target body by using, for example, the outside-in tracking, but the disclosure is not limited thereto.

In the embodiments of the disclosure, the body tracking device 299 may provide one or more body tracking results during performing the body tracking to the target body. In one embodiment, the body tracking result may be characterized by a body skeleton associated with the target body, wherein the body skeleton may include a plurality of reference points corresponding to the joints on the target body.

For example, if the target body tracked by the body tracking device 299 is a human body, the associated body tracking result may be the body skeleton formed by connecting the tracked (3D) positions of the joints on the human body, but the disclosure is not limited thereto.

In the embodiments of the disclosure, when the human body is being tracked by the body tracking device 299, the human body may be requested by the host 200 to do a specific posture for improving the body tracking performance.

In one embodiment, the specific posture may be a first posture where the human body faces the body tracking device 299 with both arms raised straight to the front. In another embodiment, the specific posture may be a second posture where the human body faces the body tracking device 299 with left arm raised straight to the front and right arm raised straight to the right. Alternatively, the specific posture may be a third posture where the human body faces the body tracking device 299 with left arm raised straight to the left and right arm raised straight to the front, but the disclosure is not limited thereto.

In FIG. 2, the trackers T1 to T3 and the body tracking device 299 may be connected with the host 200 in a wired and/or wireless manner.

In one embodiment, the body tracking device 299 may be integrated into the host 200. For example, the host 200 may be a personal computer (PC), and the body tracking device 299 may be implemented as, for example, an outside-in full body tracking (FBT) camera on the PC, but the disclosure is not limited thereto.

In the embodiments of the disclosure, the trackers T1 to T3 may be worn on and/or hold by the target body during the body tracking device 299 performing the body tracking to the target body.

Figure 3:
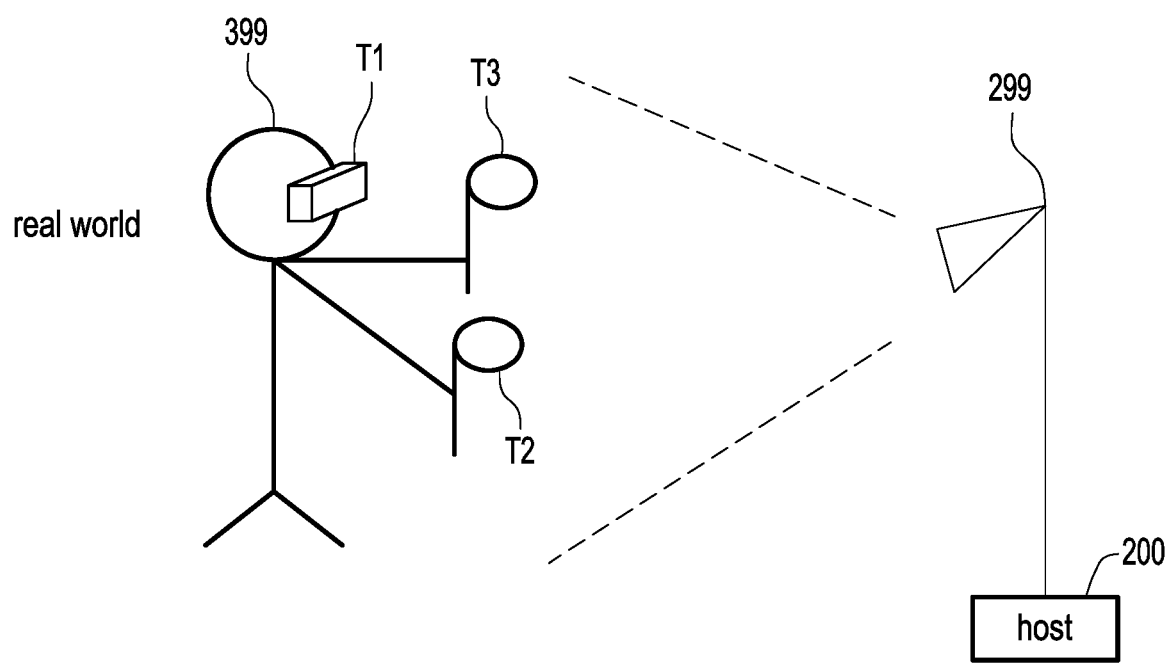
FIG. 3 shows an application scenario according to an embodiment of the disclosure.

For better understanding, FIG. 3 would be used as an example for the following discussions, but the disclosure is not limited thereto.

See FIG. 3, which shows an application scenario according to an embodiment of the disclosure. In FIG. 3, the trackers T1, T2, and T3 may be respectively assumed to be the HMD worn by the user 399 and the handheld controllers held by the user 399. In this case, the tracker poses of the trackers T1, T2, and T3 may be tracked by, for example, the tracker T1 (e.g., the HMD), and these tracker poses may be regarded as characterizing the poses of the head and hands of the user 399 and can be provided to the host 200 (e.g., a PC) for further analysis, but the disclosure is not limited thereto.

In the embodiment, the body of the user 399 (which can be understood as doing the first posture mentioned in the above) may be assumed to be the target body tracked by the body tracking device 299 (e.g., the FBT camera on the PC). In this case, the body tracking device 299 may capture one or more images of the user 399 and accordingly track the (3D) position/pose of each joint on the body of the user 399. After determining the (3D) position/pose of each joint on the user 399, the body tracking device 299 may accordingly provide the associated body skeleton of the user 399 to the host 200 as the corresponding body tracking result, but the disclosure is not limited thereto.

After receiving the tracker poses of trackers T1, T2, and T3 and the body tracking result, the host 200 may accordingly perform the tracking result calibrating method proposed in the disclosure for calibrating the body tracking result.

In the embodiments of the disclosure, the processor 204 may access the modules and/or the program code stored in the storage circuit 202 to implement the tracking result calibrating method, provided in the disclosure, which would be further discussed in the following.

Figure 4:
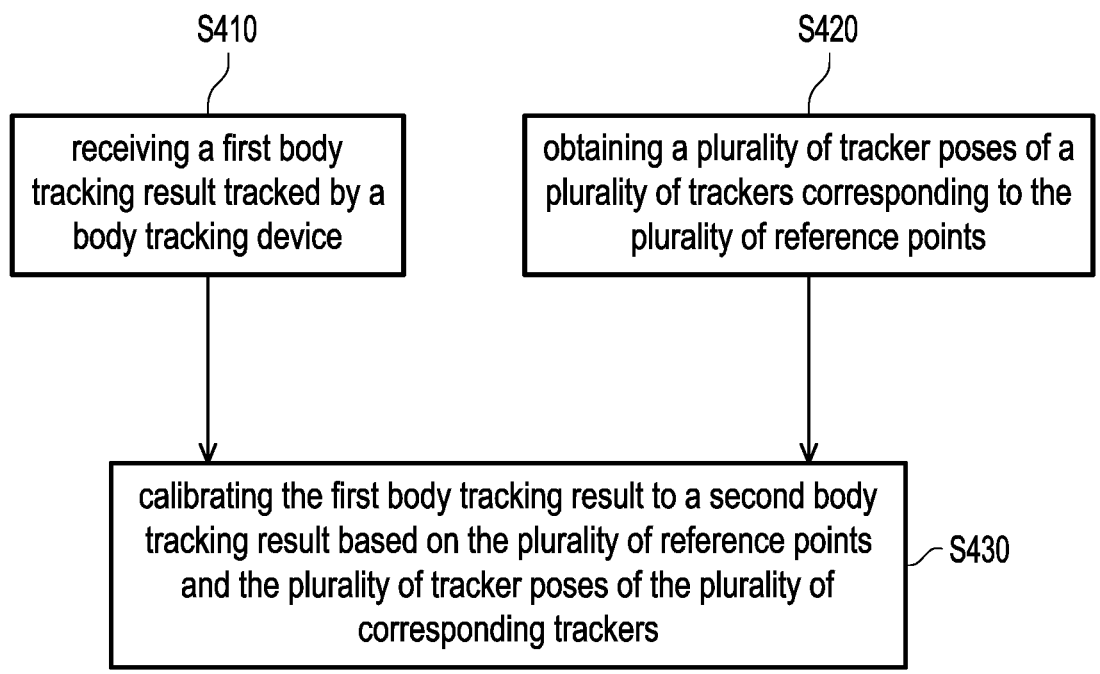
FIG. 4 shows a flow chart of the tracking result calibrating method, according to an embodiment of the disclosure.

See FIG. 4, which shows a flow chart of the tracking result calibrating method, according to an embodiment of the disclosure. The method of this embodiment may be executed by the host 200 in FIG. 2, and the details of each step in FIG. 4 will be described below with the components shown in FIG. 2. For better understanding, FIG. 5 would be used as an example, wherein FIG. 5 shows an application scenario of tracking result calibrating according to FIG. 3.

In step S410, the processor 204 receives a first body tracking result 59 tracked by the body tracking device 299, wherein the first body tracking result 59 includes a plurality of reference points.

Figure 5:
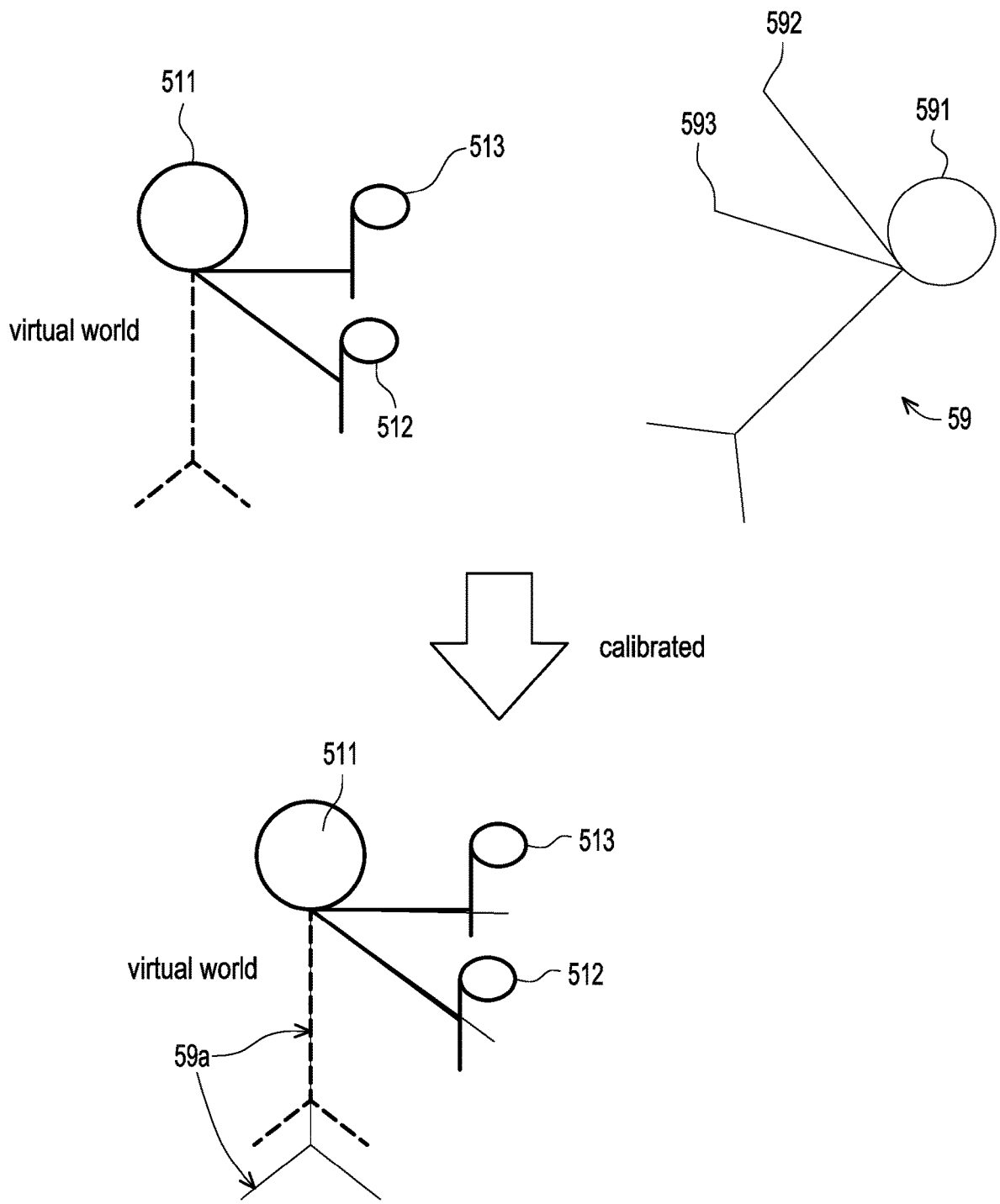
FIG. 5 shows an application scenario of tracking result calibrating according to FIG. 3.

In FIG. 5, the first body tracking result 59 may be a first body skeleton of a target body tracked by the body tracking device 299, and the plurality of reference points may correspond to a plurality of joints on the target body. In FIG. 5, the target body is assumed to be the body of the user 399, and hence the reference points on the first body tracking result 59 may correspond to the joints on the body of the user 399.

For example, the reference point 591 (which may be referred to as a first reference point) may correspond to the head of the user 399, the reference points 592 and 593 (which may be respectively referred to as a second reference point and a third reference point) may correspond to the wrists (or hands) of the user 399, but the disclosure is not limited thereto.

In step S420, the processor 204 obtains a plurality of tracker poses of a plurality of trackers corresponding to the plurality of reference points.

In the scenario of FIG. 3 and FIG. 5, the processor 204 may obtain the tracker poses 511-513 of the trackers T1-T3 (which may be respectively referred to as a first tracker, a second tracker, and a third tracker) corresponding to the reference points 591-593. More specifically, since the tracker T1 and the reference point 591 both corresponds to the head of the user 399, the tracker T1 and the reference point 591 can be regarded as corresponding to each other. In addition, since the tracker T2 and the reference point 592 both corresponds to the right hand of the user 399, the tracker T2 and the reference point 592 can be regarded as corresponding to each other. Likewise, since the tracker T3 and the reference point 593 both corresponds to the left hand of the user 399, the tracker T3 and the reference point 593 can be regarded as corresponding to each other, but the disclosure is not limited thereto.

In the embodiment where the host 200 is, for example, a PC, the host 200 may receive the tracker poses 511-513 from the trackers T1-T3 in a wired/wireless manner. In some embodiments, the host 200 itself may also be implemented as one of the trackers T1-T3. For example, the host 200 may be implemented as the HMD (e.g., the tracker T1 characterized by the tracker pose 511). In this case, the host 200 may track the tracker poses 511-513 by itself via performing, for example, the SLAM mechanism, but the disclosure is not limited thereto.

In the embodiments of the disclosure, the tracker poses 511-513 and the first body tracking result 59 may correspond to the same timestamp. That is, the timing point when the tracker poses 511-513 are determined may be the same as the timing point when the first body tracking result 59 is determined, but the disclosure is not limited thereto.

In step S430, the processor 204 calibrates the first body tracking result 59 to a second body tracking result 59a based on the plurality of reference points and the plurality of tracker poses of the plurality of corresponding trackers.

In the embodiment, the second body tracking result 59a may be understood as a calibrated body tracking result. As can be seen from FIG. 5, the second body tracking result 59a can be aligned with the tracker poses 511-513 of the corresponding trackers T1-T3. Accordingly, the user experience can be improved for not seeing some visual contents improperly rendered based on the inaccurate body tracking result.

Figure 6:
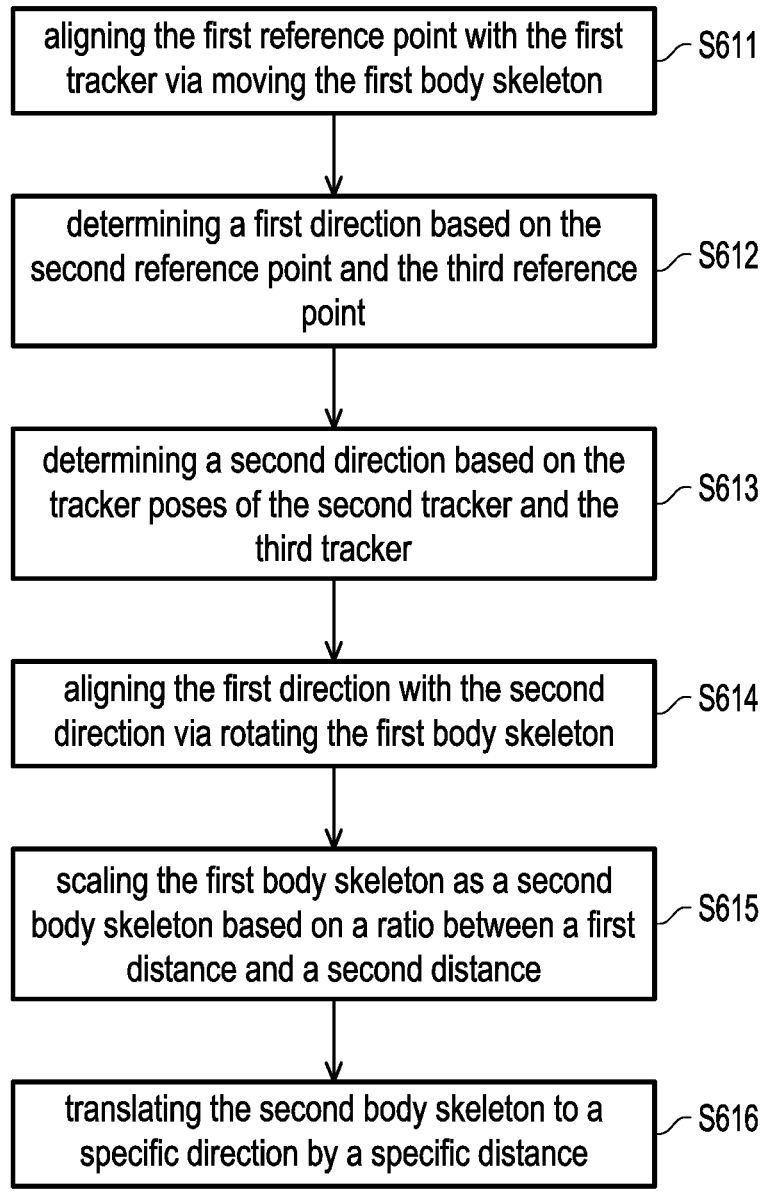
FIG. 6 shows a flow chart of calibrating the first body tracking result to the second body tracking result according to an embodiment of the disclosure.

See FIG. 6, which shows a flow chart of calibrating the first body tracking result to the second body tracking result according to an embodiment of the disclosure. For better understanding, FIG. 7A to FIG. 7C would be used as examples, wherein FIG. 7A to FIG. 7C show schematic diagrams of calibrating the body tracking result according to an embodiment of the disclosure.

Figure 7A:
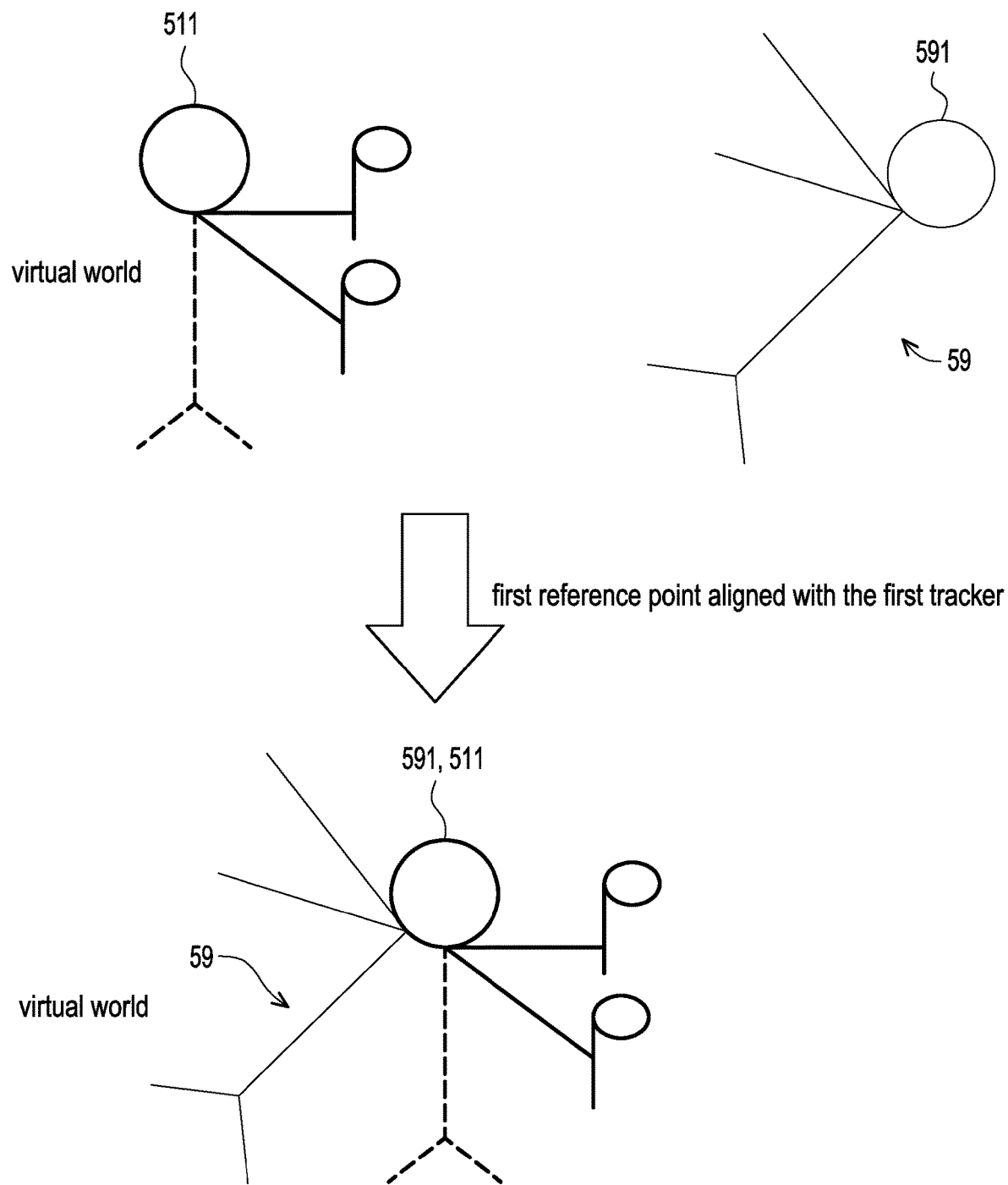
FIG. 7A to FIG. 7C show schematic diagrams of calibrating the body tracking result according to an embodiment of the disclosure.
Figure 7B:
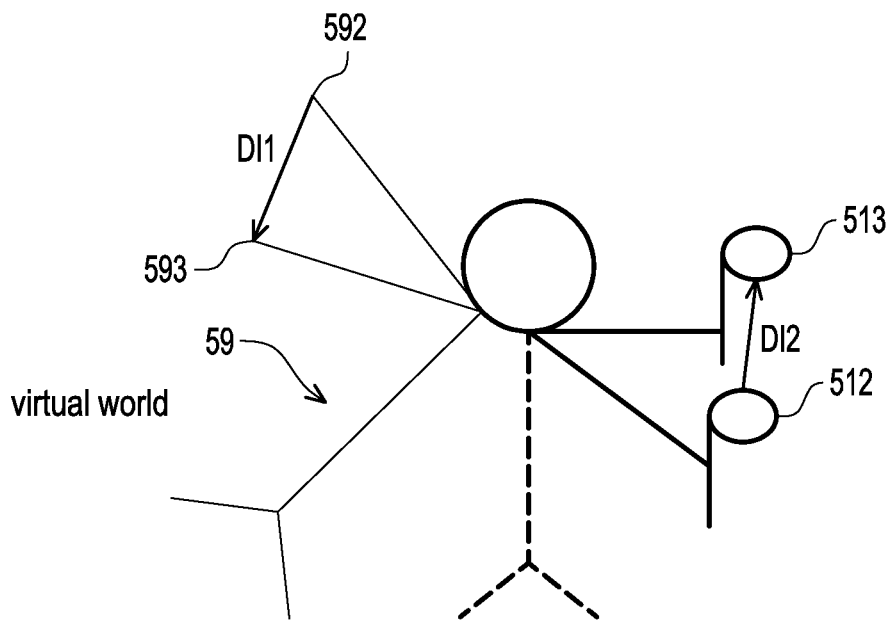
Figure 7B:
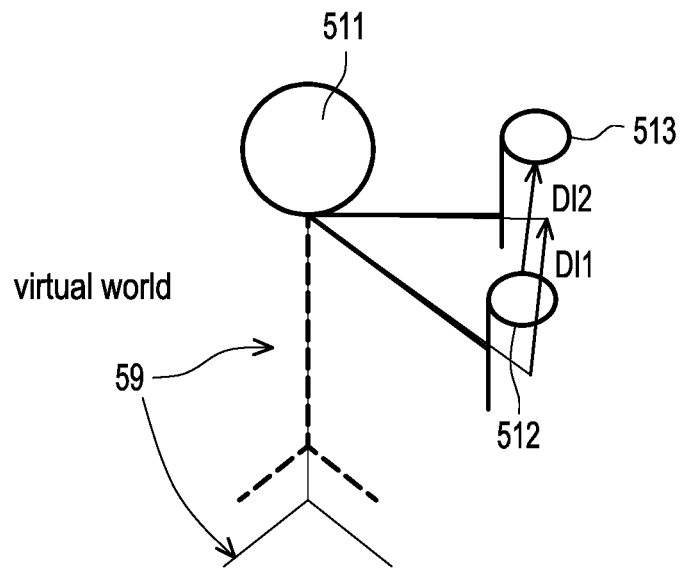
Figure 7C:
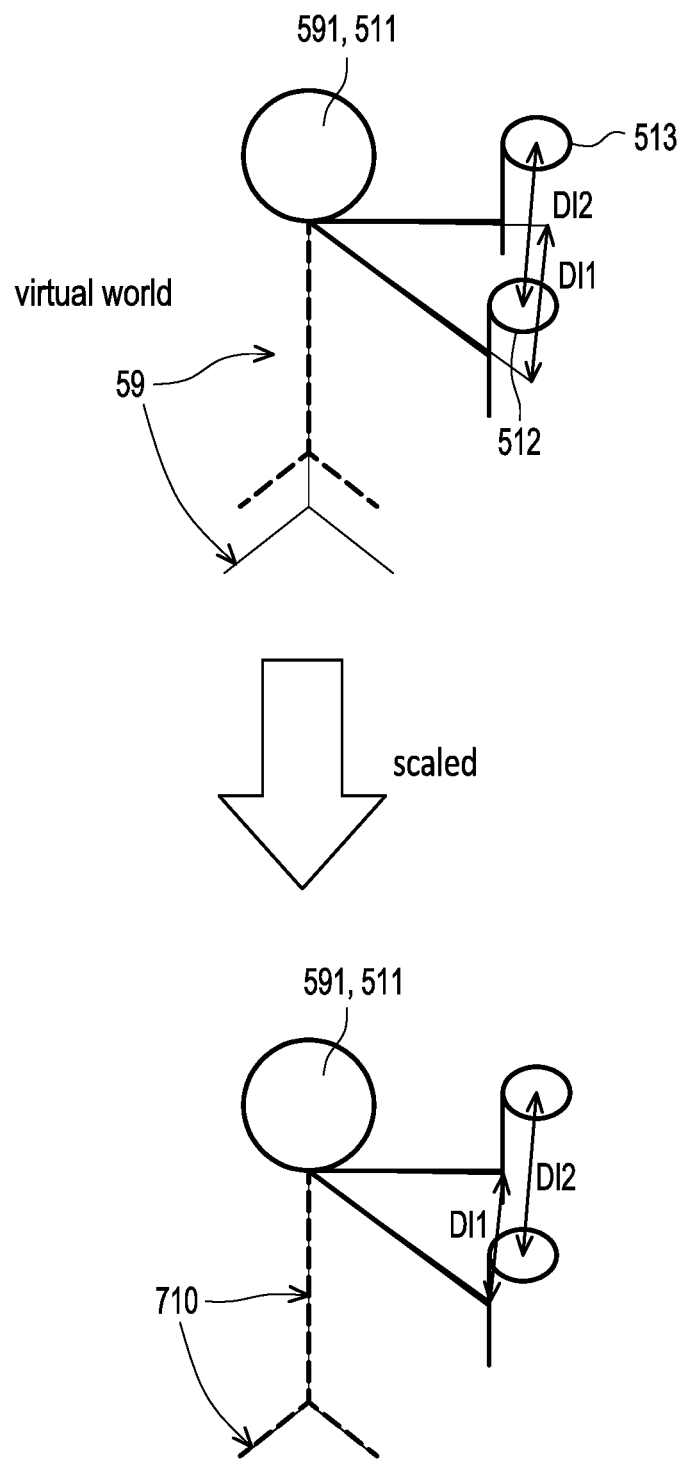

In step S611, the processor 204 aligns the first reference point (e.g., the reference point 591) with the first tracker (e.g., the tracker T1 characterized by the tracker pose 511) via moving the first body skeleton 59, and the associated process may be referred to FIG. 7A.

In FIG. 7A, the processor 204 may firstly retrieve the (3D) position of the first tracker (e.g., the tracker T1 characterized by the tracker pose 511) in the virtual world based on the tracker pose 511 of the tracker T1. Afterwards, the processor 204 may move the first body skeleton 59 as a whole, such that the first reference point (e.g., the reference point 591) in the moved first body skeleton 59 may have the same (3D) position as the first tracker (e.g., the tracker T1), but the disclosure is not limited thereto.

In step S612, the processor 204 determines a first direction DI1 based on the second reference point (e.g., the reference point 592) and the third reference point (e.g., the reference point 593). In step S613, the processor 204 determines a second direction DI2 based on the tracker poses 512, 513 of the second tracker (e.g., the tracker T2 characterized by the tracker pose 512) and the third tracker (e.g., the tracker T3 characterized by the tracker pose 513).

In FIG. 7B, the first direction DI1 may be a direction pointing from the second reference point (e.g., the reference point 592) to the third reference point (e.g., the reference point 593), and the corresponding second direction DI2 may be a direction pointing from the second tracker (e.g., the tracker T2 characterized by the tracker pose 512) to the third tracker (e.g., the tracker T3 characterized by the tracker pose 513).

In other embodiments, the first direction DI1 may be a direction pointing from the third reference point (e.g., the reference point 593) to the second reference point (e.g., the reference point 592), and the corresponding second direction DI2 may be a direction pointing from the third tracker (e.g., the tracker T3 characterized by the tracker pose 513) to the second tracker (e.g., the tracker T2 characterized by the tracker pose 512), but the disclosure is not limited thereto.

In step S614, the processor 204 aligns the first direction DI1 with the second direction DI2 via rotating the first body skeleton 59, wherein the first reference point (e.g., the reference point 591) is maintained as aligning with the first tracker (e.g., the tracker T1 characterized by the tracker pose 511) in the process of rotating the first body skeleton 59.

As can be seen from FIG. 7B, after the processor 204 rotates the first body skeleton 59 as a whole to align the first direction DI1 with the second direction DI2, the direction where the first body skeleton 59 faces has been adjusted/corrected/calibrated to correspond to the direction where the body of the user 399 faces in the virtual world, but the disclosure is not limited thereto.

In step S615, the processor 204 scales the first body skeleton 59 as a second body skeleton 710 based on a ratio between a first distance DT1 and a second distance DT2. In the embodiment, the first distance DT1 is a distance between the second reference point (e.g., the reference point 592) and the third reference point (e.g., the reference point 599), and the second distance DT2 is a distance between the second tracker (e.g., the tracker T2 characterized by the tracker pose 512) and the third tracker (e.g., the tracker T3 characterized by the tracker pose 513). In addition, the first reference point (e.g., the reference point 591) is maintained as aligning with the first tracker (e.g., the tracker T1) in a process of scaling the first body skeleton 59 as the second body skeleton 710.

In the embodiment, the ratio is determined by dividing the second distance DT2 with the first distance DT1, but the disclosure is not limited thereto.

As can be seen from FIG. 7C, after the processor 204 scales the first body skeleton 59 as a whole to the second body skeleton 710 based on the ratio in the above, the scale of the second body skeleton 710 has been adjusted/corrected/calibrated to correspond to the scale of the body of the user 399 in the virtual world, but the disclosure is not limited thereto.

However, in some embodiments, some translation error may still exist between the reference points 591-593 in the second body skeleton 710 and the corresponding trackers T1-T3.

Accordingly, the processor 204 may perform step S616 to translate the second body skeleton 710 to a specific direction by a specific distance, such that the above translation error may be reduced.

In some embodiments, the specific direction may be one of a plurality of predetermined directions, wherein the predetermined directions may be, for example, upward, downward, forward, and backward, but the disclosure is not limited thereto.

That is, the processor 204 may translate the second body skeleton 710 as a whole upward, downward, forward, or backward by the specific distance for reducing the above translation error.

In the embodiments of the disclosure, the specific direction and/or the specific distance may be determined subject to reducing at least one of a first position difference and a second position difference, wherein the first position difference is a position difference between the second reference point (e.g., the reference point 592) in the second body skeleton 710 and the second tracker (e.g., the tracker T2 characterized by the tracker pose 512), and the second position difference is a position difference between the third reference point (e.g., the reference point 593) in the second body skeleton 710 and the third tracker (e.g., the tracker T3 characterized by the tracker pose 513).

For example, the processor 204 may determine which of the predetermined directions can be used to reduce at least one of the first position difference and the second position difference. In addition, the processor 204 may also determine how the specific distance should be set in order to minimize/reduce at least one of the first position difference and the second position difference, but the disclosure is not limited thereto.

In the embodiments of the disclosure, the second body skeleton 720 after being translated in step S616 may be corresponding to the second body tracking result 59*a* in FIG. 5, which properly fits the body of the user 399 in the virtual world.

In some embodiments, one or more of the steps in FIG. 6 can be skipped if the orientation, scale, and/or position of the first body tracking result 59 is already accurate.

For example, in other embodiments where the relative poses and scales of the reference points 591-593 are already corresponding to the relative poses and scales of the tracker poses 511-513, the operation in FIG. 7A may be enough for calibrating the first body tracking result 59 to the second body tracking result 59*a* in FIG. 5. That is, the processor 204 may finish the calibration by merely performing step S611 if the orientation and scale of the first body tracking result 59 are accurate.

In this case, the moved first body skeleton 59 may be regarded as the second body skeleton 59*a*, and the subsequent steps may be skipped, but the disclosure is not limited thereto.

For another example, if the direction where the first body skeleton 59 faces already corresponds to the direction where the body of the user 399 faces in the virtual world, steps S612 to S614 may be skipped.

For yet another example, if the scale of the first body skeleton 59 already corresponds to the scale of the body of the user 399 in the virtual world, steps S615 and/or step S616 may be skipped, but the disclosure is not limited thereto.

In some embodiments, after calibrating the first body tracking result 59 to the second body tracking result 59*a*, the processor 204 may further derive a converting relationship based on the first body tracking result 59 and the second body tracking result 59*a*. In the embodiment, the converting relationship may include a series of process that can be used to convert the first body tracking result 59 into the second body tracking result 59*a*, but the disclosure is not limited thereto.

In this case, in response to receiving a new body tracking result tracked by the body tracking device 299, the processor 204 may calibrate the new body tracking result based on the converting relationship.

Specifically, since the scale/position/orientation of the new body tracking result may also be misaligned with the body of the user 399 in the virtual world, the processor 204 may use the same converting relationship to calibrate the new body tracking result, such that the scale/position/orientation of the calibrated new body tracking result can be aligned with the body of the user 399 in the virtual world, but the disclosure is not limited thereto.

In addition, although the above embodiments are discussed under the assumption of using three trackers T1-T3, it should be noted that the proposed method can also be applied to other embodiments with other amounts of trackers.

In some embodiments, the body tracking device 299 and at least one of the plurality of trackers T1-T3 may be manufactured by different manufacturers.

Specifically, if the body tracking device 299 and the trackers T1-T3 are manufactured by the same manufacturer, the used maps (e.g., a SLAM map) for characterizing the tracker poses and the reference points may be shared therebetween, and hence the technical problem mentioned in the background may not exist.

However, if the body tracking device 299 and the trackers T1-T3 are manufactured by different manufacturers, the used maps may not be shared therebetween, which may lead to the above problem of misalignment. In this case, the method proposed in the disclosure can be used to resolve this problem.

The disclosure further provides a computer readable storage medium for executing the tracking result calibrating method. The computer readable storage medium is composed of a plurality of program instructions (for example, a setting program instruction and a deployment program instruction) embodied therein. These program instructions can be loaded into the host 200 and executed by the same to execute the tracking result calibrating method and the functions of the host 200 described above.

In summary, the embodiments of the disclosure provide a solution to calibrate the body tracking result provided by a body tracking device, such that the calibrated body tracking result can be aligned with the tracker poses of the corresponding trackers. Accordingly, the user experience can be improved for not seeing some visual contents improperly rendered based on the inaccurate body tracking result.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. Tracking result calibrating method, applied to a host, comprising:
receiving, by the host, a first body tracking result tracked by a body tracking device, wherein the first body tracking result comprises a plurality of reference points, wherein the first body tracking result comprises a first body skeleton of a target body tracked by the body tracking device;
obtaining, by the host, a plurality of tracker poses of a plurality of trackers corresponding to the plurality of reference points; and
calibrating, by the host, the first body tracking result to a second body tracking result based on the plurality of reference points and the plurality of tracker poses of the plurality of corresponding trackers, wherein the plurality of reference points comprise a first reference point, the plurality of trackers comprise a first tracker corresponding to the first reference point, and calibrating the first body tracking result to the second body tracking result based on the plurality of reference points and the plurality of tracker poses of the plurality of corresponding trackers comprises:
aligning the first reference point with the first tracker via moving the first body skeleton,
wherein the plurality of reference points further comprise a second reference point and a third reference point, the plurality of trackers further comprise a second tracker and a third tracker respectively corresponding to the second reference point and the third reference point, and calibrating the first body tracking result to the second body tracking result based on the plurality of reference points and the plurality of tracker poses of the plurality of corresponding trackers further comprises:
determining a first direction based on the second reference point and the third reference point;
determining a second direction based on the tracker poses of the second tracker and the third tracker; and
aligning the first direction with the second direction via rotating the first body skeleton, wherein the first reference point is maintained as aligning with the first tracker in a process of rotating the first body skeleton.

2. The method according to claim 1, wherein the plurality of reference points correspond to a plurality of joints on the target body.

3. The method according to claim 1, wherein the target body is requested to do a specific posture.

4. The method according to claim 1, wherein calibrating the first body tracking result to the second body tracking result based on the plurality of reference points and the plurality of tracker poses of the plurality of corresponding trackers further comprises:
scaling the first body skeleton as a second body skeleton based on a ratio between a first distance and a second distance, wherein the first distance is a distance between the second reference point and the third reference point, and the second distance is a distance between the second tracker and the third tracker, wherein the first reference point is maintained as aligning with the first tracker in a process of scaling the first body skeleton as the second body skeleton.

5. The method according to claim 4, wherein the ratio is determined by dividing the second distance with the first distance.

6. The method according to claim 4, wherein calibrating the first body tracking result to the second body tracking result based on the plurality of reference points and the plurality of tracker poses of the plurality of corresponding trackers further comprises:
translating the second body skeleton to a specific direction by a specific distance.

7. The method according to claim 6, wherein the specific direction is one of a plurality of predetermined directions.

8. The method according to claim 6, wherein at least one of the specific direction and the specific distance is determined subject to reducing at least one of a first position difference and a second position difference, wherein the first position difference is a position difference between the second reference point in the second body skeleton and the second tracker, and the second position difference is a position difference between the third reference point in the second body skeleton and the third tracker.

9. The method according to claim 1, further comprising:
deriving a converting relationship based on the first body tracking result and the second body tracking result; and
in response to receiving a new body tracking result tracked by the body tracking device, calibrating the new body tracking result based on the converting relationship.

10. The method according to claim 1, wherein the body tracking device and at least one of the plurality of trackers are manufactured by different manufacturers.

11. Host, comprising:
a non-transitory storage circuit, storing a program code; and
a processor, coupled to the non-transitory storage circuit and accessing the program code to perform:
receiving a first body tracking result tracked by a body tracking device, wherein the first body tracking result comprises a plurality of reference points, wherein the first body tracking result comprises a first body skeleton of a target body tracked by the body tracking device;
obtaining a plurality of tracker poses of a plurality of trackers corresponding to the plurality of reference points; and
calibrating the first body tracking result to a second body tracking result based on the plurality of reference points and the plurality of tracker poses of the plurality of corresponding trackers, wherein the plurality of reference points comprise a first reference point, the plurality of trackers comprise a first tracker corresponding to the first reference point, and the processor is configured to perform:
aligning the first reference point with the first tracker via moving the first body skeleton, wherein
the plurality of reference points further comprise a second reference point and a third reference point, the plurality of trackers further comprise a second tracker and a third tracker respectively corresponding to the second reference point and the third reference point, and the processor is further configured to perform:
determining a first direction based on the second reference point and the third reference point;
determining a second direction based on the tracker poses of the second tracker and the third tracker; and
aligning the first direction with the second direction via rotating the first body skeleton, wherein the first reference point is maintained as aligning with the first tracker in a process of rotating the first body skeleton.

12. The host according to claim 11, wherein the processor is further configured to perform:

scaling the first body skeleton as a second body skeleton based on a ratio between a first distance and a second distance, wherein the first distance is a distance between the second reference point and the third reference point, and the second distance is a distance between the second tracker and the third tracker, wherein the first reference point is maintained as aligning with the first tracker in a process of scaling the first body skeleton as the second body skeleton.

13. The host according to claim 11, wherein the processor is further configured to perform:
translating the second body skeleton to a specific direction by a specific distance.

14. A non-transitory computer readable storage medium, the computer readable storage medium recording an executable computer program, the executable computer program being loaded by a host to perform steps of:
receiving a first body tracking result tracked by a body tracking device, wherein the first body tracking result comprises a plurality of reference points, wherein the first body tracking result comprises a first body skeleton of a target body tracked by the body tracking device;
obtaining a plurality of tracker poses of a plurality of trackers corresponding to the plurality of reference points; and
calibrating the first body tracking result to a second body tracking result based on the plurality of reference points and the plurality of tracker poses of the plurality of corresponding trackers, wherein the plurality of reference points comprise a first reference point, the plurality of trackers comprise a first tracker corresponding to the first reference point, and calibrating the first body tracking result to the second body tracking result based on the plurality of reference points and the plurality of tracker poses of the plurality of corresponding trackers comprises:
aligning the first reference point with the first tracker via moving the first body skeleton,
wherein the plurality of reference points further comprise a second reference point and a third reference point, the plurality of trackers further comprise a second tracker and a third tracker respectively corresponding to the second reference point and the third reference point, and calibrating the first body tracking result to the second body tracking result based on the plurality of reference points and the plurality of tracker poses of the plurality of corresponding trackers further comprises:
determining a first direction based on the second reference point and the third reference point;
determining a second direction based on the tracker poses of the second tracker and the third tracker; and
aligning the first direction with the second direction via rotating the first body skeleton, wherein the first reference point is maintained as aligning with the first tracker in a process of rotating the first body skeleton.

* * * * *